Patented Oct. 28, 1941

2,260,943

UNITED STATES PATENT OFFICE 2,260,943

MANUFACTURE OF ANTIKNOCK MOTOR FUEL HYDROCARBONS

Karl Korpi and Arthur R. Goldsby, Port Arthur, Tex., assignors to The Texas Company, New York, N. Y., a corporation of Delaware

REISSUED
OCT -6 1942

No Drawing. Application June 25, 1937,
Serial No. 150,316

7 Claims. (Cl. 196—10)

This invention relates to motor fuels and has to do particularly with the manufacture of antiknock motor fuel hydrocarbons.

In the manufacture of iso-octane it is customary to polymerize one or more of the butylenes present in a $C_4$ hydrocarbon fraction to di-butylenes and then hydrogenate the di-butylenes to iso-octanes. The hydrogenation of the di-butylenes to octanes is an expensive operation and requires careful control and costly equipment. We have found that these octanes may be produced directly without a hydrogenation step by reacting the olefins with isobutane.

In an unsaturated $C_4$ hydrocarbon fraction, such as cracking still gases, there are usually present besides normal butane, iso-butane, butene-1, butene-2 and iso-butene. The iso-butene may be selectively polymerized to di-isobutylene by absorbing the olefins in a selective polymerizing catalyst such as sulfuric acid of about 60–70% $H_2SO_4$ concentration, at temperatures of less than about 90° F., and then polymerizing the absorbed olefins by heating to about 200° F. By varying the concentration and temperatures, or employing less selective active catalysts, such as phosphoric acid, aluminum chloride, etc., polymerization of the normal butenes or cross-polymerization between the iso-butene and normal butenes may be effected to produce isomeric octylenes.

The formation of the polymerized olefins may precede or be concurrent with production of the octanes. Where the preparation of the olefins, for example octenes, such as di-isobutylene, takes place first, the entire operation may take the form of a two-stage process comprising polymerization and then conversion to the octane. On the other hand by using proper reagents and suitable conditions, the polymerization and conversion to octanes may take place in one stage by using a suitable olefin mixture, such as a $C_4$ unsaturated hydrocarbon fraction which contains sufficient iso-butane. Furthermore, regardless of the source or type of manufacture of the di-butylenes or octylenes, we may convert such hydrocarbons from any source to octanes in accordance with our invention.

It is contemplated that in addition to octylene fractions may olefin stock such as polymer naphtha may be converted to saturated products. And while we prefer to use iso-butane as the iso-paraffin for the reaction with olefin stocks, iso-pentane or a mixture of iso-butane and iso-pentane may be used.

While the invention is not restricted or dependent on any theory of reaction, it is believed that in the alkylation of unsaturated $C_4$ hydrocarbons with iso-butane, polymerization precedes the alkylation whereby octenes are formed and then the iso-octanes are produced through a secondary reaction of the iso-octenes with iso-butane as follows:

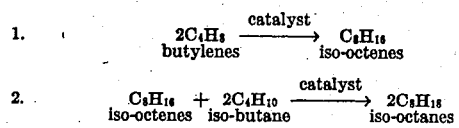

Ordinarily when polymerizing butylenes to iso-octenes in the presence of a catalyst such as sulfuric acid, a considerable amount of high boiling polymers, such as the trimers, are formed unless conditions are carefully controlled. In the presence of large amounts of iso-butane, however, the polymerization to higher polymers is largely avoided, due to the alkylation of the dimer to iso-octanes.

In practicing the invention a cracked $C_4$ hydrocarbon fraction containing normal and iso-butenes may be treated with sulfuric acid of about 60–70% $H_2SO_4$ concentration at a temperature of about 80–90° F. to selectively absorb the tertiary olefins. The solution of sulfuric acid and olefins is then treated at a temperature of about 180–210° F. to polymerize the olefins to di-isobutylene. The di-isobutylene is then reacted with iso-butane in the presence of about 90–100% concentration sulfuric acid to form iso-octane.

The following example will illustrate the conversion of di-isobutylene and iso-butane to iso-octane in accordance with the present invention. The di-isobutylene was obtained from selective polymerization of an unsaturated $C_4$ petroleum fraction.

The di-isobutylene fraction (98.5% boiling between 90–125° C.) and iso-butane in the ratio of 1.35 mols of di-isobutylene to 5.22 mols of iso-butane were reacted in the presence of sulfuric acid of about 94% $H_2SO_4$ concentration. The amount of acid used was about 1½ parts of acid to one part of the hydrocarbons. The di-isobutylene fraction was gradually fed into the mixture of the acid and iso-butane during agitation, allowing a reaction time after addition of the di-isobutylene of about one hour. The temperature was maintained at about 87–93° F. and the pressure about 30–45 lbs. gauge. The yield of iso-octane was about 165% by volume of di-isobutene charged. The unreacted iso-butane, approximately 2.50 mols, was recovered, showing approximately theoretical conversion of di-isobutylene and iso-butane to iso-octane according to Equation 2 given above. Approximately 75% by volume of the product distilled up to 257° F., about 18% distilled from 257-374° F., about 4% from 374-410° F. and 2.2% above 410° F. The octane value of the fraction boiling up to 257° F. was about 90 and the unsaturation of the fraction less than one per cent.

The above example is merely illustrative. It is contemplated that di-isobutylene from any source may be used for reacting with the isobutane. Also it is contemplated that other dibutylenes or octylene fractions may be used. For example, mixed octenes resulting from cross polymerization of iso-butene with normal butene, or mixtures of normal octenes and iso-octenes resulting from the polymerization of C₄ fractions under more drastic conditions or with less selective catalysts may be used. In general, higher temperatures, stronger acid, or increased time of reaction than that required to produce relatively pure iso-octene, will produce mixtures, and in case of stepwise polymerization, the normal octenes may be produced from the unreacted products after removal of the tertiary olefins, by increasing the severity of the polymerization.

The ratio of the olefin stock to the iso-butane may vary from that given in the illustrative example. In general, it is preferable to use isobutane in an amount at least equal in weight to that of the olefin in the stock, or more.

The temperature and pressure may vary. Temperatures of 70–90° F. are preferred, although temperatures as low as zero or below may be used. In some cases it may be desirable to use temperatures as high as 100° F. or higher. The pressure need only be that necessary to maintain the products in the liquid phase. The time of reaction will vary with the temperature and usually runs from 30 minutes to 2 or 3 hours.

While we have described a batch operation, it is contemplated that the process may be operated continuously by feeding the olefins and acid to a reaction coil, or chamber, from which reaction products are withdrawn. It is desirable in a continuous operation to maintain the reaction products of acid and olefins, or alkyl esters, at a low concentration.

Obviously many modifications and variations of the invention, as hereinbefore set forth, may be made without departing from the spirit and scope thereof and therefore only such limitations should be imposed as are indicated in the appended claims.

We claim:
1. A process for the manufacture of normally liquid hydrocarbons boiling within the gasoline boiling range, which comprises reacting low boiling polymers, resulting from polymerization of C₄ olefins, with an isoparaffin selected from the group consisting of isobutane and isopentane in the presence of concentrated sulfuric acid catalyst, and maintaining throughout the entire reaction a substantial excess of the isoparaffin in the reacting mixture, whereby alkylation of the isoparaffin is effected and a substantially saturated liquid reaction product is produced.

2. A process in accordance with claim 1 in which the sulfuric acid employed is in excess of 90% concentration.

3. A process in accordance with claim 1 in which the reacting mixture is maintained substantially in liquid phase.

4. A process in accordance with claim 1 in which the low-boiling polymers comprise di-isobutylene.

5. A process in accordance with claim 1 in which the low-boiling polymers comprise mixed octenes resulting from cross-polymerization of isobutylene with a normal butene.

6. A process in accordance with claim 1 in which the low-boiling polymers comprise normal octenes resulting from polymerization of normal butenes essentially free from isobutylene.

7. A process for the manufacture of normally liquid hydrocarbons boiling within the gasoline boiling range, which comprises reacting a low-boiling polymer, resulting from polymerization of a C₄ olefin, with a low-boiling isoparaffin in the presence of strong sulfuric acid catalyst of alkylation strength, maintaining throughout the reaction a substantial molar excess of isoparaffin over the stoichiometrical equivalent monomeric contents of the olefin, and maintaining the alkyl ester reaction product of acid and olefin at a low concentration, whereby alkylation of the isoparaffin with the olefin polymer is effected.

KARL KORPI.
ARTHUR R. GOLDSBY.